(12) United States Patent
Takagi et al.

(10) Patent No.: US 9,103,477 B2
(45) Date of Patent: Aug. 11, 2015

(54) STRAP-BAND TYPE CONNECTING DEVICE

(71) Applicant: Sogyo Co., Ltd., Aichi (JP)

(72) Inventors: Ryuichi Takagi, Aichi (JP); Shigenobu Kimura, Aichi (JP)

(73) Assignee: Sogyo Co., Ltd., Aichi (JP)

( * ) Notice: Subject to any disclaimer, the term of this patent is extended or adjusted under 35 U.S.C. 154(b) by 0 days.

(21) Appl. No.: 13/833,885

(22) Filed: Mar. 15, 2013

(65) Prior Publication Data

US 2014/0123441 A1    May 8, 2014

(30) Foreign Application Priority Data

Nov. 6, 2012  (JP) ................................. 2012-244262
Nov. 6, 2012  (JP) ................................. 2012-244398

(51) Int. Cl.
| F16L 33/08 | (2006.01) |
| F16L 33/02 | (2006.01) |
| F16L 33/00 | (2006.01) |

(52) U.S. Cl.
CPC ................. *F16L 33/02* (2013.01); *F16L 33/00* (2013.01); *F16L 33/08* (2013.01); *Y10T 24/1427* (2015.01); *Y10T 24/1431* (2015.01); *Y10T 24/1441* (2015.01); *Y10T 24/44239* (2015.01); *Y10T 24/44248* (2015.01)

(58) Field of Classification Search
USPC ....... 24/20 R, 269, 274 R, 274 WB, 483, 484
See application file for complete search history.

(56) References Cited

U.S. PATENT DOCUMENTS

| 2,910,758 | A | * | 11/1959 | Arthur .......................... 24/274 R |
| 3,900,932 | A | * | 8/1975 | Allert .......................... 24/274 R |
| 3,950,830 | A | * | 4/1976 | Duprez ......................... 24/274 R |
| 4,099,304 | A | * | 7/1978 | Luc .............................. 24/274 R |
| 4,197,620 | A | * | 4/1980 | Heuchert ...................... 24/274 R |
| 4,237,588 | A | * | 12/1980 | Rasmussen et al. ......... 24/274 R |
| 4,257,149 | A | * | 3/1981 | Sydendal ..................... 24/274 R |
| 4,473,928 | A | * | 10/1984 | Johnson ........................... 24/483 |

(Continued)

FOREIGN PATENT DOCUMENTS

| CN | 201992197 U | 9/2011 |
| CN | 102478137 A | 5/2012 |

(Continued)

OTHER PUBLICATIONS

Reasons for Rejection issued in corresponding Japanese Patent Application No. 2012-244262 dated Jan. 22, 2013.

(Continued)

*Primary Examiner* — Robert J Sandy
*Assistant Examiner* — David Upchurch
(74) *Attorney, Agent, or Firm* — Morgan, Lewis & Bockius LLP (57) ABSTRACT

In a strap-band type connecting device (1), provided is a housing (4) work-hardened and has a bottomed frame (4c) having a frame portion (4b) and a bottom base (4a) in one piece. The housing (4) has a strength and rigidity higher enough to resist a torsional force (K) when a rod screw (9) is rotationally operated. Even when the rod screw (9) is rotationally operated accidentally with a magnitude more than an allowable amount of torque, it is possible for the housing (4) to resist the torsional force (K) with a sufficient strength insured, so as to keep the strap band (3) winding around the connection hose (2) in a favorable condition for an extended period of time.

4 Claims, 6 Drawing Sheets

(56) References Cited

U.S. PATENT DOCUMENTS

| | | | | |
|---|---|---|---|---|
| 4,706,346 A | * | 11/1987 | Verges | 24/274 R |
| 6,000,104 A | * | 12/1999 | Mann | 24/274 R |
| 6,449,813 B2 | * | 9/2002 | Keller et al. | 24/274 R |
| 6,845,549 B2 | * | 1/2005 | Keller et al. | 24/274 R |
| 7,594,304 B2 | * | 9/2009 | Ito et al. | 24/279 |
| D609,997 S | * | 2/2010 | Andersson | D8/396 |
| 2002/0007536 A1 | | 1/2002 | Keller et al. | |
| 2005/0028329 A1 | * | 2/2005 | Castellanos | 24/274 R |
| 2007/0283538 A1 | | 12/2007 | Ito et al. | |

FOREIGN PATENT DOCUMENTS

| | | |
|---|---|---|
| GB | 2 150 205 A | 6/1985 |
| JP | 63-23405 A | 1/1988 |
| JP | 1-176293 U | 12/1989 |
| JP | 6-507465 U | 8/1994 |
| JP | 06-40396 Y | 10/1994 |
| JP | 7-44962 U | 12/1995 |
| JP | 2002-013682 A | 1/2002 |
| JP | 2003-28366 A | 1/2003 |
| JP | 2007-333078 A | 12/2007 |
| JP | 4738328 B | 8/2011 |
| WO | 2005/100842 A1 | 10/2005 |

OTHER PUBLICATIONS

Arguments and Amendments filed in corresponding Japanese Patent Application No. 2012-244262 dated Feb. 21, 2013.
Notice of Allowance issued in corresponding Japanese Patent Application No. 2012-244262 dated Mar. 19, 2013.
Notice of Allowance issued in corresponding Japanese Patent Application No. 2012-244398 dated Jan. 22, 2013.
Chinese Office Action issued in Chinese Patent Application No. 201310128189.8 on May 22, 2015.

* cited by examiner

STRAP-BAND TYPE CONNECTING DEVICE

BACKGROUND OF THE INVENTION

1. Field of the Invention

The present invention relates to a strap-band type connecting device which has a strap band provided to wind around a connecting portion between a tubular element and a metallic pipe with a predetermined winding force, and particularly concerns to a strap-band type connecting device in which a rod screw is rotatably provided within a housing.

2. Description of Prior Art

A strap-band type connecting device has a strap band provided to wind around a connector hose which serves as an article to be wound. In recent years, the connector hose has been used to vehicular air-conditioners which compress liquid refrigerant with high pressure. The connector hose also has been used to vehicular turbo-chargers which are exposed to high pressure with high ambient temperature. In order to cope with those adverse environments in which the connector hose is installed, high endurance properties have been required for the connector hose.

As one way to cope with the above adverse environments, it has been considered to increase a mechanical strength of the connector hose. For this purpose, the connector hose is reinforced with a hardness-increased rubber or shored up with an increased number of fibers embedded in the rubber.

As an alternative, the strap band is integrally formed with the connector hose by means of a synthetic resin so as to produce a glue-compound structure. The connector hose formed by the glue-compound structure requires a winding force higher than the ordinary rubber hose had needed. Various ways have been searched for seeking how to insure a stable winding force at the connector hose.

As a general structure of this type of strap band, an array of slit teeth is provided at one end side of the strap band, and a housing is provided at the other end side of the strap band.

Within the housing, the one end side overlaps with the other end side of the strap band, a rod screw engages its helical thread with the slit teeth. In combination with a rotational operation of the rod screw, the rod screw makes the one end side slide against the other end side of the strap band so as to tightly wind around the connector hose.

As examples of the strap-band type connecting device, prior art references disclose analogous devices. Among these prior art references, a first reference introduces a screw band (Laid-open Japanese Utility Application No. 07-44962). A second reference introduces a hose clamping device (Laid-open Japanese Utility Application No. 01-176293). A third reference introduces a hose clamp (Laid-open Japanese Patent Application No. 2003-28366). A fourth reference introduces a hose clip (Laid-open Japanese Domestic Patent Application No. 06-507465). A fifth reference introduces a clamping device for connection (Japanese Patent No. 4738328).

In the first through fifth references, a band has an accommodation portion called in turn as a winding portion, a housing, a housing portion, a casing and a housing, each of which rotatably accommodates a worm screw. The worm screw engages its helical thread tightly with respective bridged braces located between the neighboring slit teeth, so as to wind around the connector hose when the worm screw is rotationally operated.

Since the bridged brace is subjected to a reactionary force from the worm screw during the process in which the worm screw slides its helical thread on the bridged brace upon rotationally operating the worm screw, the reactionary force subjects the housing to a torsional force around the radial direction of the band.

Especially when a higher torque is applied accidentally to the rod screw, the bridged braces would be subjected to a larger amount of bending force from the helical thread. This leads to unfavorably deforming the housing to reduce the winding force, thereby resultantly loosen the band due to the deteriorated engagement between the helical thread and the bridged brace.

Therefore, the present invention has been made with the above drawbacks in mind, it is a main object of the invention to provide a strap-band type connecting device in which the housing is formed by a work-hardened bottomed frame, and the housing has a strength and rigidity higher enough to resist the torsional force exerted when the rod screw is rotationally operated, and making it possible for the housing to resist the torsional force with a sufficient strength and an improved durability even when the rod screw is rotationally operated accidentally with a magnitude more than an allowable amount of torque.

SUMMARY OF THE INVENTION

According to the present invention, there is provide a strap-band type connecting device in which an open-ended annular strap band has one end side and the other end side, both of which are curved to overlap each other so as to wind around an article to be wound. A housing is fixedly secured to the one end side of the strap band.

A rod screw is rotatably provided within the housing, and the rod screw has a helical thread formed at predetermined pitch intervals. A series of slits is circumferentially provided on the other end side of the strap band at regular intervals in parallel relationship with each other. The slits traverse across a width direction of the strap band in an oblique fashion against a circumferential direction of the strap band. An array of teeth each has a bridged brace between the neighboring slits to make the helical thread engage with the bridged brace when the helical thread of the rod screw is brought into engagement with the slits within the housing. Upon rotationally operating the rod screw in a predetermined direction, the rod screw makes the helical thread slide along the bridged brace so as to move the one end side in relative to the other end side to diametrically reduce the strap band, so that the strap band deforms to tightly wind around the article to be wound.

The housing is formed by a metallic sheet plastically drawn by means of a drawing procedure to have a bottomed frame rectangularly shaped in integral with a depth-reduced frame portion and a bottom base, so that the bottomed frame forms a rectangular flat box having an open-ended upper surface. The metallic sheet which has a rectangular left opening and a right opening, the latter of which has a small hole. The left and right openings are plastically deformed to spread outward at lower areas of the frame portion during the drawing procedure, and the left opening serves as a first insert opening, and the right opening serves as a second insert opening each located in left and right sides along a circumferential direction of the strap band. The first and second insert openings each admit the one end side of the strap band to pass therethrough into the housing. The small hole serves as an insert notch. One side of the bottomed frame has a support hole above the first insert opening, and the other side of the bottomed frame has the insert notch above the second insert opening. The rod screw has a support shaft portion to be inserted into the support hole so as to bring the other end portion into rotatable engagement with an upper peripheral end of the insert notch.

One end side of the strap band has an oblong opening, and a pair of spaced projections is formed to rise from left and right open ends of the oblong opening along the circumferential direction of the strap band. The projections have a topmost end ridge directed toward the bottom base, left and right end sides of which have a cavity corresponding to the projections so as to admit the projections by engagement.

Such is the structure that the bridged brace is subjected to a reactionary force from the rod screw during the process in which the rod screw slides its helical thread along the bridged brace upon rotationally operating the rod screw. The reactionary force subjects the housing to a torsional force around the radial direction of the strap band.

Since the housing is formed by the work-hardened bottomed frame, the housing has a strength and rigidity higher enough to resist the torsional force exerted when the rod screw is rotationally operated. This makes it possible for the housing to resist the torsional force with a sufficient strength and an improved durability even when the rod screw is rotationally operated accidentally with a magnitude more than an allowable amount of torque.

This enables the housing to maintain a good engagement condition between the helical thread and the bridged brace, so as to keep the strap band winding around the article in a favorable condition for an extended period of time.

Such is the structure that the projections are admitted into the corresponding cavities by engagement upon securing the housing to the one end side of the strap band. This makes it possible to retain the one end side of the strap band immobilized at the bottom base as a securement structure.

Since the projections are provided in integral with the one end side of the strap band, it is possible to retain the bottom base immobilized at the one end of the strap band without adding any component part discretely. This makes it possible to render the securement structure simple and advantageous in terms of manufacturing cost.

With the housing provided to have the open-ended upper surface as the rectangular flat box, it is possible to make the housing cost-saving and light-weight with a reduced amount of material, while at the same time, improving a productivity with a quick forming procedure to substantially save a manufacturing cost.

With the housing provided to have the open-ended upper surface as the rectangular flat box, it is possible to visually recognize the oblong opening from above the housing through the open-ended upper surface.

This makes it possible to quickly place the bottom base in position between the projections without looking an inside of the strap band when putting the projections into the cavities by engagement. This brings an improved assemblability of the bottom base against the strap band.

According to other aspect of the present invention, the strap band places one end side on an inner surface of the bottom base when the first and second insert openings each admit the one end side of the strap band to pass therethrough into the housing.

Such is the structure that it is possible to quickly assemble the strap band to the housing only by inserting the one end side of the strap band into the first and second insert openings with a simplified operation. This brings an improved assemblability which leads to a good productivity particularly advantageous when reduced to mass production.

In this instance, the strap band makes the one end side place on the inner surface of the bottom base so as to increase a contact area therebetween, thereby strengthening a securement of the bottom base against the one end side of the strap band.

As a general construction of the bottom base, the bottom base is divided into a left tab and a right tab. The left and right tabs are each inturned to embrace the one end side of the strap band, and secured to the one end side by means of the caulking procedure. The left tab has a top end located to oppose a top end of the right tab.

In this general construction, when the rod screw is subjected to a rotational force more than the allowable torque while operating the rod screw, the housing is subjected to the torsional force which is transmitted to the bottom base. Then, the torsional force deforms the bottom base and separates the right tab from the left tab at a butting portion between both the top ends of the right tab and the left tab. This would deteriorate the securement of the bottom base against the one end side of the strap band.

Contrary to the general construction, the bottom base of the invention is formed in one piece with the frame portion by means of the drawing procedure. Since the bottom base is work-hardened and physically strengthened, even when the bottom base is subjected to the torsional force, the bottom base remains unchanged substantially so as to favorably maintain a good securement of the bottom base against the one end side of the strap band.

According to other aspect of the present invention, the helical thread of the rod screw has a trapezoidal profile in cross section to form a trapezoidal screw.

Such is the structure that the trapezoidal profile of the helical thread makes it possible to bring the helical thread into engagement with the bridged brace in the proximity of a root of the helical thread.

This means that the helical thread engages with the bridged brace at a place where the helical thread increases its thickness and physically strengthened.

This also means that the helical thread engages with the bridged brace through an enlarged engagement area, thereby stabilizing the engagement of the helical thread against the bridged brace, while at the same time, increasing the number of engaged portions of the helical thread against the bridged braces.

As a result, the helical thread produces a pushable force strengthened against the bridged brace so as to increase a traction force to attract the other end side to slide toward the one end side of the strap band when the rod screw is rotationally operated.

According to other aspect of the present invention, the metallic sheet is stainless steel based alloy and a thickness of the bottomed frame is determined to be within a range of 1.0 mm to 2.0 mm.

With the bottomed frame strengthened by work-hardening the metallic sheet by means of the drawing procedure, it is possible to render the bottomed frame light-weight with its thickness reduced so as to be readily handled and inspected while insuring the physical strength needed.

BRIEF DESCRIPTION OF THE DRAWINGS

A preferred form of the present invention are illustrated in the accompanying drawings in which.

DETAILED DESCRIPTION OF PREFERRED EMBODIMENTS

In the following description of the depicted embodiments, the same reference numerals are used for features of the same type. Positions and directions of the various members are used to correspond to right-left sides, and up-down sides of the attached drawings throughout each embodiment of the invention.

Figure 1:
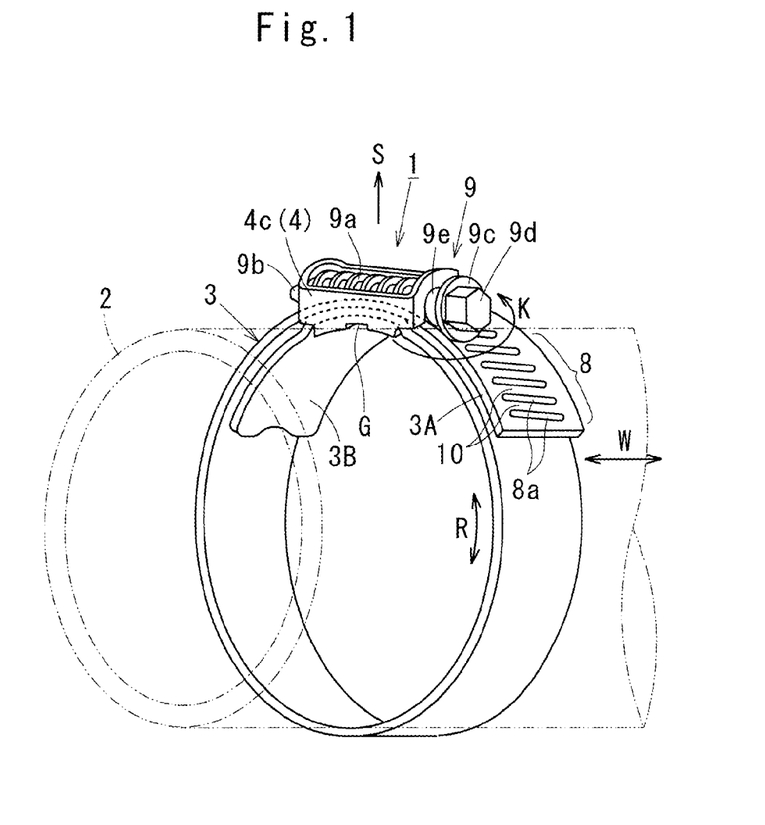
FIG. 1 is a perspective view of a strap-band type connecting device according to a first embodiment of the invention.

Referring to FIGS. 1 through 7 which describe a strap-band type connecting device 1 according to a first embodiment of the invention. As shown in FIG. 1, the strap-band type connecting device 1 is applied to a connection hose 2 which serves as an article to be wound. The connection hose 2 is made of, for example, a hardened rubber or fiber-reinforced rubber to enhance the mechanical strength by considering durability or endurance recently required for the connection hose 2.

For this reason, the strap-band type connecting device 1 is improved to well suit for cases in which the connection hose 2 requires a greater amount of winding force (surface pressure) working as a binding force for the connection hose 2.

By way of illustration, in an internal combustion engine equipped with a turbo-charger (not shown), an intercooler device is used to cool an intaken air compressed to enhance an air-compression ratio. The strap-band type connecting device 1 is used to connect the intercooler device to an air intake pipe (not shown) in the internal combustion engine equipped with the turbo-charger.

The strap-band type connecting device 1 has an open-ended annular strap band 3 having one end side 3A and the other end side 3B, both of which are curved to overlap each other so as to wind around the connection hose 2 as described in detail hereinafter.

The strap band 3 is formed into a ribbon-like configuration with a certain length and width from an elastic material such as, for example, SUS304-based stainless steel sheet.

To the one end side 3A of the strap band 3, a housing 4 is secured to position substantially along a tangential direction of the strap band 3. As shown in FIGS. 2 through 5, the housing 4 is formed by a stainless steel sheet (e.g., SUS304) by means of a drawing procedure. The housing 4 has a bottomed frame 4c rectangularly drawn in integral with a depth-reduced frame portion 4b and a bottom base 4a. This means that the bottomed frame 4c forms a rectangular flat box having an open-ended upper surface. The bottomed frame 4c measures 1.5 mm as a thickness (t) by way of example. The bottomed frame 4c may have the thickness (t) within a range of 1.0 mm to 2.0 mm.

Figure 2:
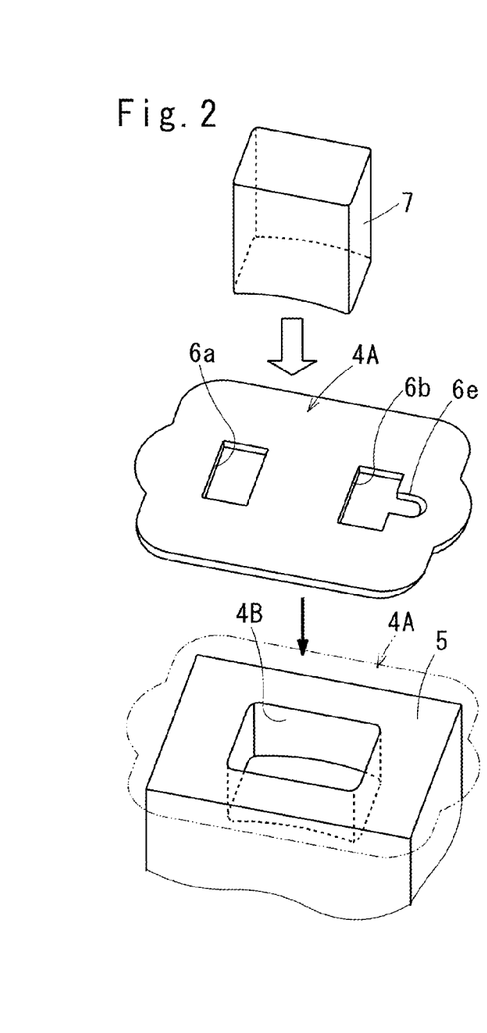
FIGS. 2-5 are schematic views showing processes how a metallic sheet is deformed into a bottomed frame by means of a drawing procedure upon producing a housing.

Upon manufacturing the bottomed frame 4c as shown in FIG. 2, prepared is a metallic sheet 4A which has a rectangular left opening 6a and a right opening 6b, the latter of which has a small hole 6e perforated.

Figure 3:
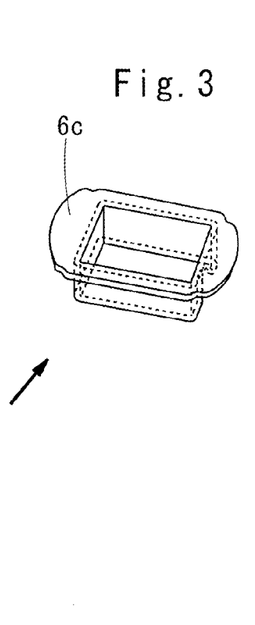
Figure 4:
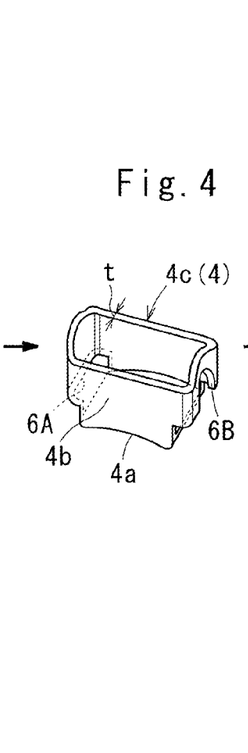

Under the metallic sheet 4A, installed is a rectangular mould die 5 which has a rectangular cavity 4B. A metallic slider 7 is hammered down on the metallic sheet 4A to intrude the sheet 4A into the cavity 4B during the process of the drawing procedure. After the metallic sheet 4A is drawn, the drawn sheet 4A is taken out of the cavity 4B to represent an original box-shaped frame, an upper end side of which has burred flaps 6c as shown in FIG. 3. The burred flaps 6c are severed and removed from the box-shaped frame and the severed ends are polished to produce the bottomed frame 4c as shown in FIG. 4.

During the processes in which the metallic sheet 4A is drawn, the left and right openings 6a, 6b are plastically deformed to spread outward at lower areas of the frame portion 4b. The left opening 6a serves as a first insert opening 6A, and the right opening 6a serves as a second insert opening 6B each located in left and right sides along a circumferential direction R of the strap band 3.

The first and second insert openings 6A, 6B each admit the one end side 3A of the strap band 3 to pass therethrough into the housing 4. The small hole 6e serves as an insert notch 6C, with which a rod screw 9 brings its shaft portion 9e into rotatable engagement as described in detail hereinafter.

At one side of the bottomed frame 4c, provided is a support hole 4d just above the first insert opening 6A. At the other side of the bottomed frame 4c, located is the insert notch 6C just above the second insert opening 6B.

It is to be noted that instead of providing the left, right opening 6a, 6b and the small hole 6e on the metallic sheet 4A, the first, second insert openings 6A, 6B and the insert notch 6C may be formed by means of machining such as, for example, a blanking after the metallic sheet 4A was drawn.

Figure 5:
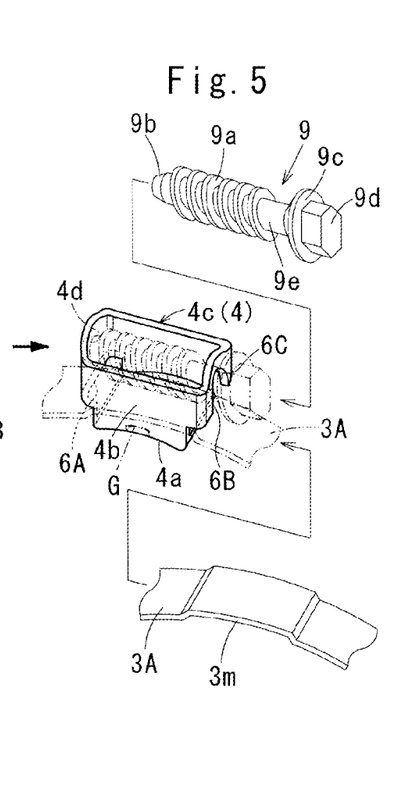

As shown at phantom lines in FIG. 5, one end side 3A of the strap band 3 is inserted into the first, second insert openings 6A, 6B, and placed on an inner surface of the bottom base 4a. The bottom base 4a is fixedly secured to the one end side 3A of the strap band 3 by means of a caulking procedure. With an outer surface of the one end side 3A of the strap band 3, overlapped is the other end side 3B of the strap band 3 which is rendered into arcuate configuration.

Figure 6:
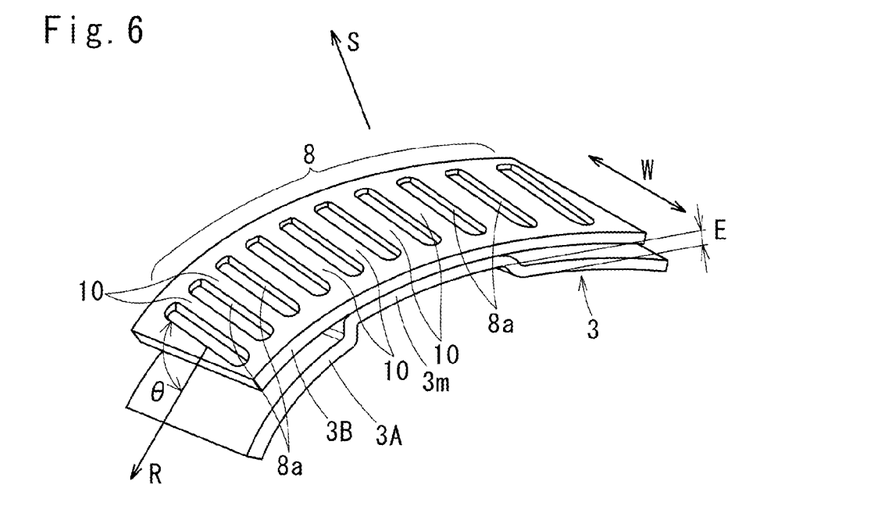
FIG. 6 is a perspective view of one end side overlapped with the other end side of the strap band.

As shown in FIG. 6, on the other end side 3B of the strap band 3, circumferentially provided is a series of slits 8a at regular intervals in parallel relationship with each other. The slits 8a traverses across a width direction W of the strap band 3 in an oblique fashion to form an angle (θ) against a circumferential direction R of the strap band 3.

Figure 7:
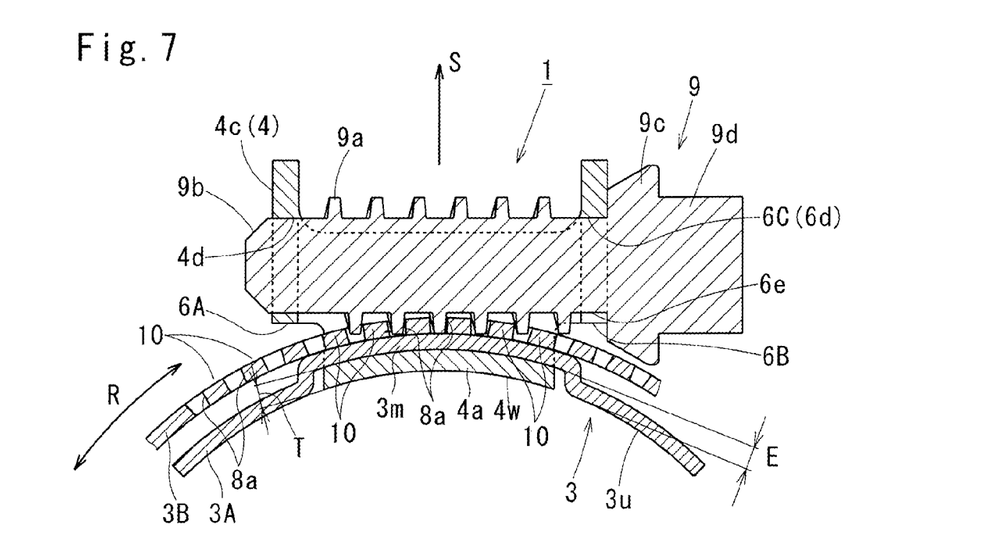
FIG. 7 is a longitudinal cross sectional view showing that a rod screw engages its helical thread with bridged braces at an array of teeth.

Within the housing 4, rotatably provided is the rod screw 9 which has a helical thread 9a formed at predetermined pitch intervals as also observed in FIG. 7. The rod screw 9 serves as a worm-type gear, and has a trapezoidal profile in cross section to represent a trapezoidal screw.

One end of the rod screw 9 has a support shaft portion 9b, and the other end of the rod screw 9 has a diameter-increased flange 9c and a hexagonal head 9d in the proximity of the flange 9c. The rod screw 9 is rotatably disposed within the housing 4 through the insert notch 6C. The rod screw 9 inserts the support shaft portion 9b into the support hole 4d, and brings the other end portion into rotatable engagement with an upper peripheral end 6d of the insert notch 6C. The flange 9c comes in contact with an outer surface of the frame portion 4b to secure the shaft portion 9e against removal.

The rod screw 9 is placed within the bottomed frame 4c of the housing 4 with the bottom base 4a secured to the one end side 3A of the strap band 3 by means of the caulking procedure. The rod screw 9 brings its helical thread 9a into the corresponding slits 8a.

An array of teeth 8 is provided, each of which has a bridged brace 10 between the neighboring slits 8a to make the helical thread 9a engage with the bridged brace 10 when the helical thread 9a of the rod screw 9 is introduced into the slits 8a within the housing 4.

The one end side 3A of the strap band 3 has a bulged portion 3m overlapped with the bottom base 4a. The bulged portion 3m is distended in an outward direction from the strap band 3 along the radial direction S to accommodate the bottom base 4a. The distended amount E of the bulged portion 3m is substantially tantamount to a thickness T of the bottom base 4a, so that an outer surface 4w of bottom base 4a is substantially in flush with an inner surface 3u of the strap band 3.

With the structure thus far described, upon rotationally operating the rod screw 9 through the hexagonal head 9d, the rod screw 9 makes the helical thread 9a slide along the briged brace 10 to frictionally move the other end side 3B in relative to the one end side 3A of the strap band 3 in a direction to wind the strap band 3 around the connection hose 2, so that the strap band 3 deforms to decrease its diameter to tightly bind the connection hose 2.

Since the rod screw 9 is subjected to a reactionary force from the bridged brace 10 when the rod screw 9 is rotationally operated during the process in which the rod screw 9 slides the helical thread 9A against the array of teeth 8, the housing 4 is subjected to a torsional force K around a radial direction S on an outer surface of the strap band 3 (refer to FIG. 1).

In the embodiment of the invention, the housing 4 is work-hardened to produce the bottomed frame 4c to have the frame portion 4b and the bottom base 4a in one piece, the housing 4 has a strength and rigidity higher enough to resist the torsional force K when the rod screw 9 is rotationally operated.

For this reason, even when the rod screw 9 is rotationally operated accidentally with a magnitude more than an allowable amount of torque, it is possible for the housing 4 to resist the torsional force K with a sufficient strength insured. This maintains a preferable engagement condition between the bridged brace 10 and the helical thread 9a, so as to keep the strap band winding around the connection hose 2 in a favorable condition for an extended period of time.

The first insert opening 6A and the second insert opening 6B are provided on the frame portion 4b of the bottomed frame 4c to admit the one end side 3A of the strap band 3 to pass therethrough into the housing 4 before the bottom base 4a is fixedly secured to the one end side 3A of the strap band 3 by means of caulking.

This makes it possible to quickly assemble the strap band 3 to the housing 4 only by inserting the one end side 3A of the strap band 3 into the first and second insert openings 6A, 6B with a simplified operation. This brings an improved assemblability which leads to a good productivity particularly advantageous when reduced to mass production.

Since the bottom base 4a is fixedly secured to the one end side 3A of the strap band 3 by means of caulking, it is possible to facilitate the securement procedure, as opposed to the case in which the bottom base is secured to the strap band by means of a welding procedure, or a combination of a bolt and nut.

Because the strap band 3 places one end side 3A on the bottom base 4a, the strap band 3 makes the one end side 3A contact with an inner surface of the bottom base 4a so as to increase the contact area therebetween, thereby strengthening a securement of the bottom base 4a against the one end side 3A of the strap band 3.

As a general construction of the bottom base, the bottom base is divided into a left tab and a right tab. The left and right tabs are each inturned to embrace the one end side 3A of the strap band 3, and secured to the one end side 3A by means of the caulking procedure. The left tab has a top end located to oppose a top end of the right tab.

In this general construction, when the rod screw 9 is subjected to a rotational force more than the allowable torque while operating the rod screw 9, the housing 4 is subjected to the torsional force K which is transmitted to the bottom base. Then, the torsional force K deforms the bottom base and separates the right tab from the left tab at a butting portion between both the top ends of the right tab and the left tab. This would deteriorate the securement of the bottom base against the one end side 3A of the strap band 3.

Contrary to the general construction, the bottom base 4a of the present invention is formed in one piece with the frame portion 4b by means of the drawing procedure.

Since the bottom base 4a is work-hardened and physically strengthened, even when the bottom base 4a is subjected to the torsional force K, the bottom base 4a remains unchanged so as to favorably maintain the good securement of the bottom base 4a against the one end side 3A of the strap band 3.

With the bulged portion 3m provided on the strap band 3 to accommodate the bottom base 4a with the outer surface 4w of the bottom base 4a is flush with the inner surface 3u of the strap band 3.

Such is the structure that although the bulged portion 3m is distended in the outward direction, the bottom base 4a makes its outer surface 4w in flush with the inner surface 3u of the strap band 3.

This makes it possible for the strap band 3 to evenly wind around an entire surface of the connection hose 2 without reducing the winding force unequally at the place where the bulged portion 3m is situated.

The rod screw 9 has the helical thread 9a which forms the trapezoidal profile in cross section. The trapezoidal profile of the helical thread 9a makes it possible to bring the helical thread 9a into engagement with the bridged brace 10 in the proximity of a root of the helical thread 9a.

This means that the helical thread 9a engages with the bridged brace 10 at a place where the helical thread 9a increases its thickness and physically strengthened.

This also means that the helical thread 9a engages with the bridged brace 10 through an enlarged engagement area, thereby stabilizing the engagement of the helical thread 9a against the bridged brace 10, while at the same time, increasing the number of engaged portions of the helical thread 9a against the bridged brace 10.

As a result, the helical thread 9a produces a pushable force strengthened against the bridged brace 10 so as to increase a traction force to attract the other end side 3A toward the one end side 3A of the strap band 3 when the rod screw 9 is rotationally operated.

Attention is drawn to the fact that the metallic sheet 4A is made of the stainless steel based alloy and the thickness (t) of the bottomed frame 4c determined to be within 1.5 mm (with the range of 1.5 mm to 2.0 mm).

With the bottomed frame 4c strengthened by work-hardening the metallic sheet 4A by means of the drawing procedure, it is possible to render the bottomed frame 4c light-weight with its thickness (t) reduced so as to be readily handled and inspected while insuring the physical strength needed.

Figure 8:
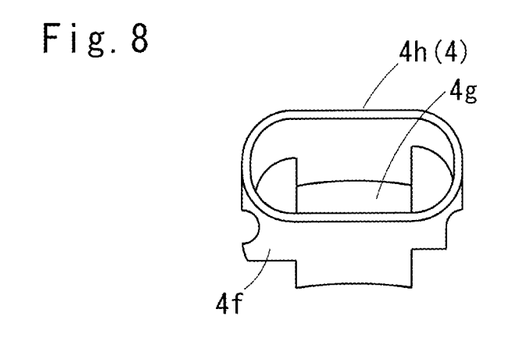
FIG. 8 is a perspective view of the bottomed frame drawn as a housing according to a second embodiment of the invention.

FIG. 8 shows a second embodiment of the invention in which a bottomed frame 4h is formed by an elliptical frame portion 4f and an oval bottom base 4g instead of the rectangular configuration.

Figure 9:
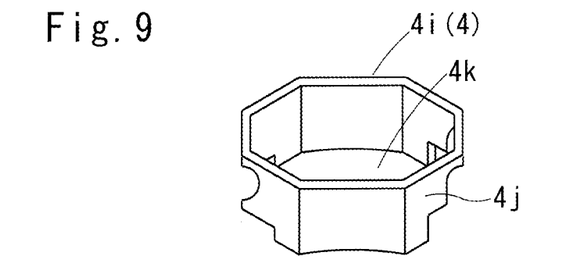
FIGS. 9-11 are perspective views of modified forms of the bottomed frame drawn as the housing.
Figure 10:
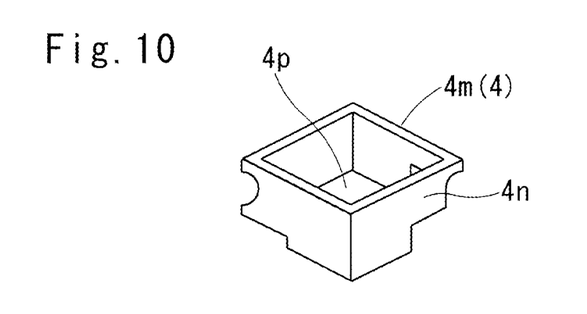
Figure 11:
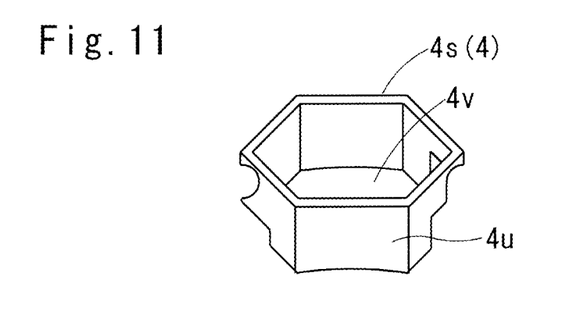

Alternatively, a bottomed frame 4i may be made from an octagonal frame portion 4j and an octagonal bottom base 4k in the circumferential direction R of the strap band 3 as shown in FIG. 9. A bottomed frame 4m may be further made from a diamond-shaped frame portion 4n and an octagonal bottom base 4p in the circumferential direction R of the strap band 3 as shown in FIG. 10. A bottomed frame 4s may be still further made from a hexagonal frame portion 4u and a hexagonal bottom base 4v in the circumferential direction R of the strap band 3 as shown in FIG. 11.

The bottomed frames 4i, 4m, 4s are illustrated as flat-shaped modification form of the second embodiment which effectuates the same advantages as obtained in the first embodiment of the invention.

FIGS. 12 through 16 show a third embodiment of the invention in which the bottom base 4a is fixedly secured to the strap band 3 by means of a securement structure 20 in lieu of the caulking procedure. Due to the presence of the securement structure 20, the bulged portion 3m is omitted in the third embodiment of the invention.

Figure 12:
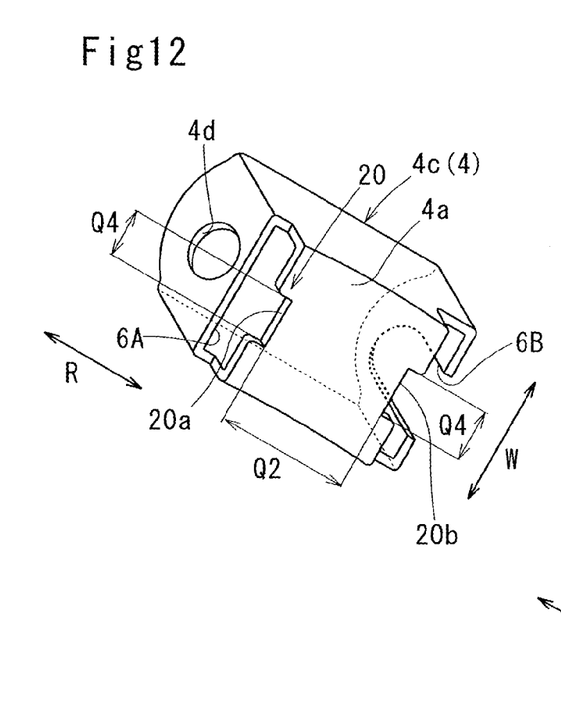
FIG. 12 is a perspective view of the housing according to a third embodiment of the invention.

In the securement structure 20, a pair of spaced projections 21, 22 is provided on the one end side 3A of the strap band 3 along the circumferential direction R of the strap band 3.

Figures 13, 14:
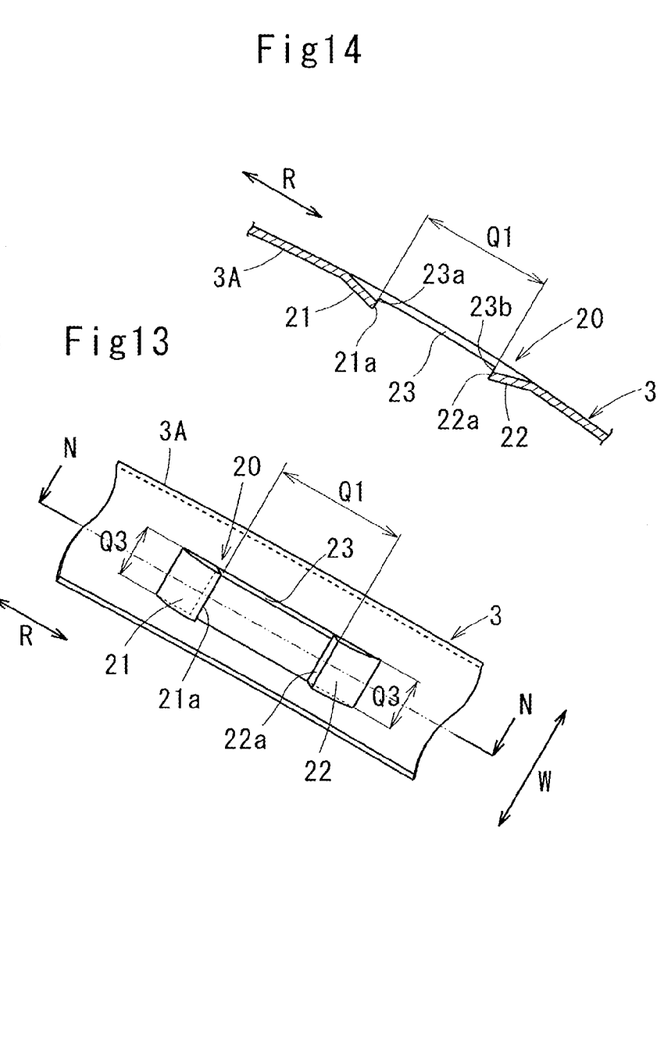
FIG. 13 a perspective view showing one end side of the strap band.
FIG. 14 is a longitudinal cross sectional view taken along the line N-N of FIG. 13.

As shown in FIGS. 12 and 13, the projections 21, 22 have topmost end ridges 21a, 22a directed toward the bottom base 4a, left and right end sides of which are each notched to have rectangular cavities 20a, 20b which correspond to the projections 21, 22 so as to admit the projections 21, 22 by engagement, as described in detail hereinafter.

An oblong opening 23 is provided on the one end side 3A of the strap band 3 along the circumferential direction R as observed in FIG. 14. The projections 21, 22 are formed by such as, for example, a pressing procedure to rise from the left and right open ends 23a, 23b of the oblong opening 23.

The projections 21, 22 distances their topmost end ridges 21a, 22a in the circumferential direction R by a first interval Q1. The first interval Q1 is equal to a second interval Q2 provided between the two cavites 20a, 20b. A breadth Q3 of the topmost end ridges 21a, 22a is equal to a niche space Q4 of the cavites 20a, 20b along the width direction W of the strap band 3.

Figure 15:
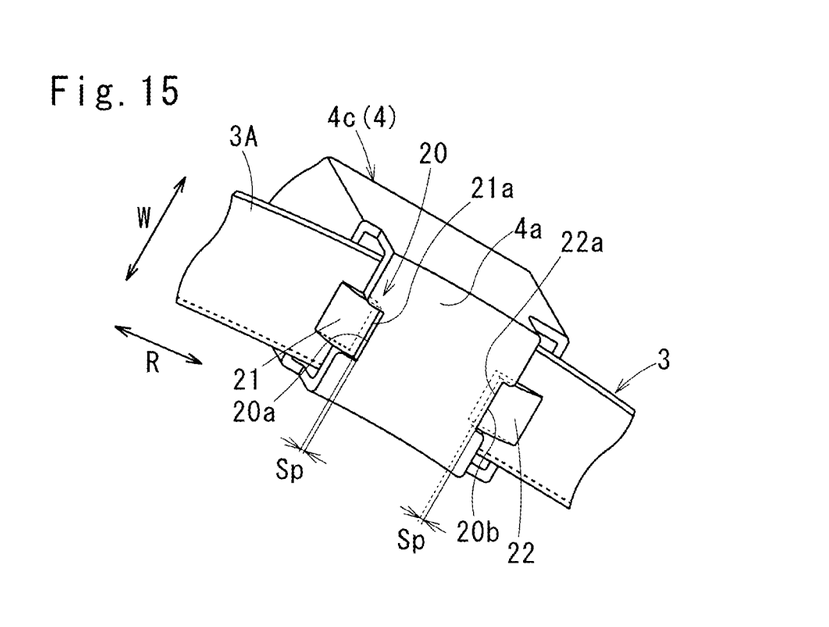
FIG. 15 is a perspective view of a securement structure in which the housing is fixedly secured to the strap band.

Upon placing the one end 3A of the strap band 3 in the housing 4 as shown in FIG. 15, the projections 21, 22 are located to interpose the bottom base 4a between the topmost end ridges 21a, 22a in the circumferential direction R for the cavites 20a, 20b to admit the corresponding projections 21, 22 by engagement.

With the result that the cavites 20a, 20b are admitted by the projections 21, 22, the housing 4 is fixedly secured to the strap band 3 with the bottom base 4a immobilized in both the circumferential direction R and width direction W of the strap band 3.

In this instance, although a stepped portion Sp slightly appears between an outer surface of the cavity 20a (20b) and the topmost end ridge 21a (22a), the stepped portion Sp may be mechanically ground to substantially form a flush surface.

Figure 16:
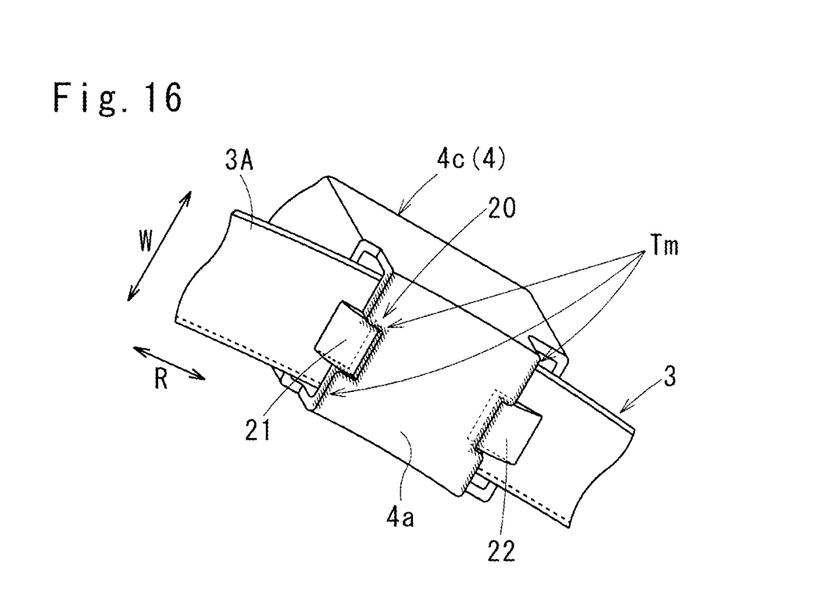
FIG. 16 is a perspective view showing that angular ridges of the bottom base are smoothed by means of a deburring procedure.

After the housing 4 is secured to the one end side 3A of the strap band 3, angular ridges of the bottom base 4a are smoothed by means of a deburring procedure as shown at hatching regions in FIG. 16.

Such is the structure that the projections 21, 22 are admitted into the corresponding cavities 20a, 20b by engagement upon securing the housing 4 to the one end side 3A of the strap band 3. This makes it possible to retain the one end side 3A of the strap band 3 immobilized at the bottom base 4a as a securement structure 20.

Since the projections 21, 22 are provided in integral with the one end side 3A of the strap band 3, it is possible to retain the bottom base 4a immobilized at the one end 3A of the strap band 3 without adding any component part discretely. This makes it possible to render the securement structure 20 simple and advantageous in terms of manufacturing cost.

With the housing 4 provided to have the open-ended upper surface as the rectangular flat box, it is possible to visually recognize the oblong opening 23 from above the housing 4 through the open-ended upper surface.

This makes it possible to quickly place the bottom base 4a in position between the projections 21, 22 without looking an inside of the strap band 3 when putting the projections 21, 22 into the cavities 20a, 20b by engagement. This brings an improved assemblability of the bottom base 4a against the strap band 3.

MODIFICATION FORMS (a) In the first through third embodiments of the invention, instead of the SUS-based stainless steel, a reinforced synthetic resin, a copper sheet or various types of alloyed metal may be used to the strap band 3. The bottomed frame 4c is not confined to a rectangular in shape, but may be triangular, quadrangular or pentagonal.

(b) The thickness (t) of the bottomed frame 4c is determined to be 1.5 mm (within the range of 1.0-2.0 mm) by way of example, the thickness (t) may be changed as desired depending on usage or situation in which the housing 4 is to be placed.

(c) The bottomed frame 4c may be plastically formed into a cylindrical configuration from the metallic sheet 4A in lieu of the drawing procedure.

(d) Although the housing 4 is secured to the strap band 3 along the tangential direction against the strap band 3, the housing 4 may be placed substantially along the tangential direction, and not precisely placed along the tangential direction. Since marginal errors from the tangential direction is an allowable level, the housing 4 may be placed along the tangential direction merely from a practical point of view.

(e) Instead of the caulking procedure used to secure the bottom base 4a to the strap band 3, various types of welding (resistance-welding, projection-welding, arc-welding, TIG-welding, plasma-welding or laser-welding) may be used upon fixedly securing the bottom base 4a to the one end side 3A of the strap band 3.

(f) Instead of forming the helical thread 9a in the trapezoidal profile in cross section, the helical thread may be triangular profile in cross section.

(g) The rod screw 9 may be formed along a drum-like profile (hyperbolic cylinder) in order to increase the number of engaged portions of the helical thread 9a against the bridged brace 10.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

What is claimed is:

1. A strap-band type connecting device comprising:
an open-ended annular strap band having one end side and the other end side, both of which are curved to overlap each other so as to wind around said article to be wound;
a housing fixedly secured to said one end side of said strap band;
a rod screw rotatably provided within said housing, said rod screw having a helical thread formed at predetermined pitch intervals;
a series of slits circumferentially provided on said other end side of said strap band at regular intervals in parallel relationship with each other, said slits traversing across a width direction of said strap band in an oblique fashion against a circumferential direction of said strap band;
an array of teeth each having a bridged brace between the neighbouring slits to make said helical thread engage with said bridged brace when said helical thread of said rod screw is brought into engagement with said slits within said housing;
whereby upon rotationally operating said rod screw in a predetermined direction, said rod screw makes said helical thread slide along said bridged brace so as to move said one end side in relative to said other end side to diametrically reduce said strap band, so that said strap band deforms to tightly wind around said article to be wound,
said housing provided to have a bottomed frame rectangularly shaped in integral with a depth-reduced frame portion and a bottom base, so that said bottomed frame has a rectangular flat box having an open-ended upper surface, said rectangular flat box which has a rectangular left opening and a right opening, the latter of which has a small hole, said left and right openings spreading outward at lower areas of said frame portion, and said left opening serving as a first insert opening, and said right opening serving as a second insert opening each located in left and right sides along a circumferential direction of said strap band, said first and second insert openings each admitting said one end side of said strap band to pass therethrough into said housing, said small hole serving as an insert notch, one side of said bottomed frame having a support hole above said first insert opening, the other side of said bottomed frame having said insert notch above said second insert opening, said rod screw having a support shaft portion to be inserted into said support hole so as to bring the other end portion into rotatable engagement with an upper peripheral end of said insert notch, and
said one end side of said strap band having an oblong opening, a pair of spaced projections being formed to rise from left and right open ends of said oblong opening along said circumferential direction of said strap band, said projections having a topmost end ridge directed toward said bottom base, left and right end sides of which have a cavity corresponding to said projections so as to admit said projections by engagement.

2. The strap-band type connecting device according to claim 1, wherein said strap band places said one end side on an inner surface of said bottom base when said first and second insert openings each admitting said one end side of said strap band to pass therethrough into said housing.

3. The strap-band type connecting device according to claim 1, wherein said helical thread of said rod screw has a trapezoidal profile in cross section so as to form a trapezoidal screw.

4. The strap-band type connecting device according to claim 1, wherein said metallic sheet is stainless steel based alloy and a thickness of said bottomed frame is determined to be within a range of 1.0 mm to 2.0 mm.

* * * * *